Feb. 17, 1931.  E. B. CARNS  1,793,055
LANDING GEAR
Filed April 2, 1929  2 Sheets-Sheet 1

Inventor
*Edmund B. Carns*
By his Attorneys
Haguet & Meary

Feb. 17, 1931.  E. B. CARNS  1,793,055
LANDING GEAR
Filed April 2, 1929  2 Sheets-Sheet 2
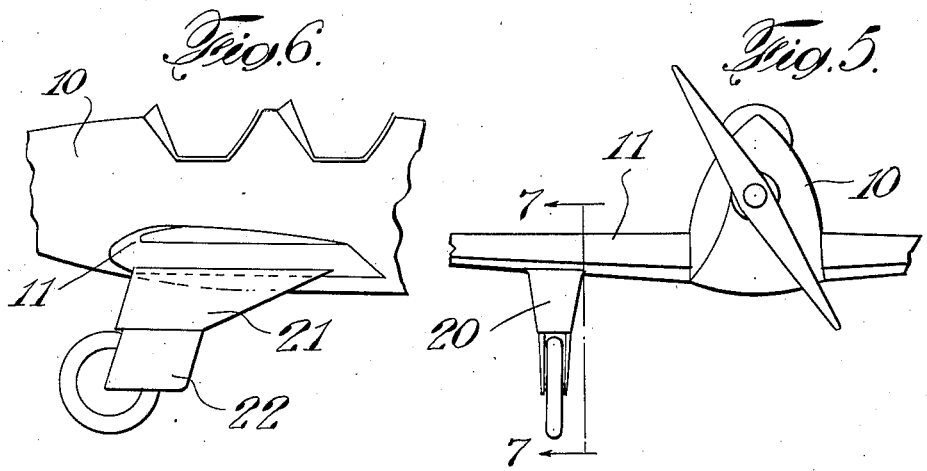
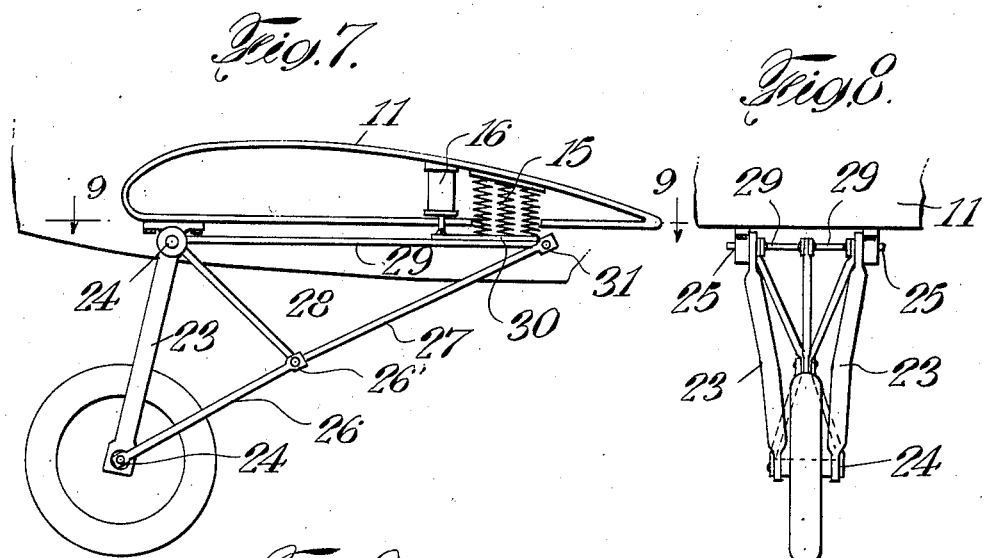
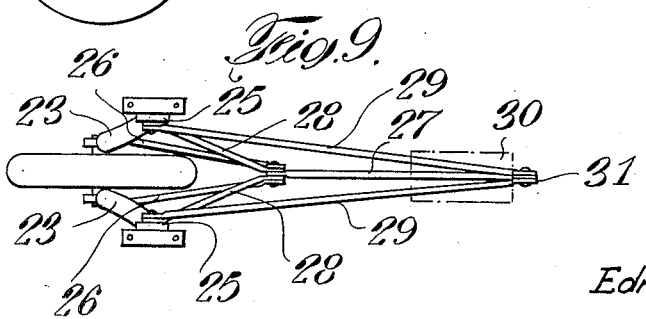
Inventor
Edmund B. Carns
By his Attorneys Patented Feb. 17, 1931

1,793,055

UNITED STATES PATENT OFFICE

EDMUND B. CARNS, OF NEW YORK, N. Y., ASSIGNOR TO CAIRNS DEVELOPMENT COMPANY, OF WILMINGTON, DELAWARE, A CORPORATION OF DELAWARE

LANDING GEAR

Application filed April 2, 1929. Serial No. 351,868.

This invention relates to improvements in landing gear for aircraft.

There is always the latent tendency for an aircraft when landing or taxiing to tend to tip over on to its nose. This condition may be brought about by rough or soft ground, too sudden an application of the brakes or other factors. When the forward motion of the wheels is suddenly retarded a leverage action is brought into play between the wheels and the fuselage. The wheel struts and braces thus pivot at the line of the axle and tend to throw the body of the plane forward on its nose or even completely overturn the plane.

One of the primary objects of my invention is to overcome the difficulties stated above. Other objects and advantages of the invention will become apparent from the following description taken in conjunction with the drawings in which Figure 1 represents a side elevation of an aircraft equipped with my landing gear;

Figure 5 is a front elevation showing a modification of my device;

Figure 6 is a side elevation of the same;

Figure 7 is a section at 7—7 of Figure 5 with the outer cover removed;

Figure 8 is a front elevation of Figure 7; and

Figure 9 is a section taken at 9—9 of Figure 7.

Referring more particularly to the drawings in which like reference characters denote like parts:

Figure 4:
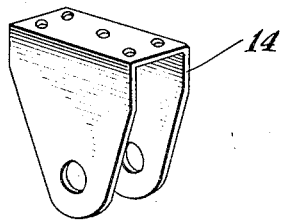
Figure 4 shows a pivot connection.

10 is an airplane of any of the usual types having the wings 11. The landing gear is represented by reference character 12. The landing gear includes struts 13 which may be of a solid structure as shown, or of other similar type, which are pivoted at 14 in the pivot element as shown in Figure 4. These struts 13 are of a generally triangular shape having a wheel at one of the points of angles, a spring connection with the wing at another point and pivotally connected with the wing at a third point or angle between the other angles. The struts may be of solid construction such as a pressed metal piece, or they may be of the conventional wood or frame construction. The wheels connected to the struts are positioned in a forward relationship to the pivot connection with the wing so that there is always present a leverage action in which the wheels tend to move in an upward direction pivoting around front wing connection. The rear end of these struts 13 is attached by means of springs 15 to the wing 11. The springs are recessed in the wing and guiding elements may be attached to the wing and the struts 13 to guide their movement. Dash pots or shock absorbers 16 of conventional type also connect the wing and struts and are adapted to operate so that the recoil movement of the springs is controlled and the struts prevented from slapping against the wing. The triangular struts 17 of the landing gear are also fitted with pivoting devices at 18, inasmuch as they must move when the struts 13 move.

Figure 5 shows a modification of my device in which I have achieved an added improvement in stream line effect and in which 10 denotes a conventional fuselage, 11 a portion of a wing and 20 the modification of my landing gear. Figure 6 shows a metal sheet stream lining element 21 and a second stream lining element 22 by means of which the landing wheel is partially stream lined. In Figures 7, 8 and 9 I show the structural elements of this modification of landing gear with the stream lining 21 and 22 removed. This structure is preferably built up of metal tubes but various other types of structural elements may be used. 23 designates the main strut elements which are placed on each side of the wheel axle 24 and extend upward to a pivot connection with the wing 11 at 25. 26 designates a structural element which runs from the wheel towards the trailing edge of the wing. These elements run from each side of the axle 24 and come together at 26' and extend from there as a single element 27 to the rear portion 31. 28 designates elements which extend from each of the pivots 24 to point 26'. 29 are elements which extend from each pivot point 24 horizontally rearward to fasten with the element 27. 30 is a plate connected to the members 29 and to which are connected the springs 15 and the dash pot 16 already described above.

Figure 1:
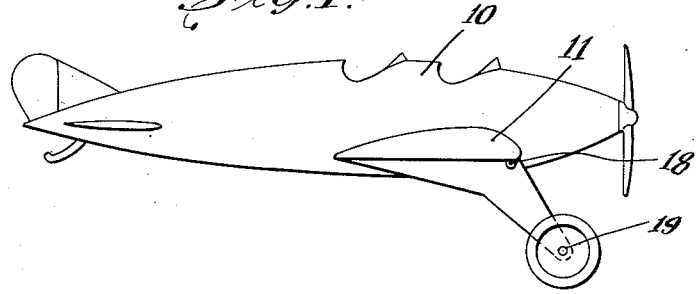
Figure 2:
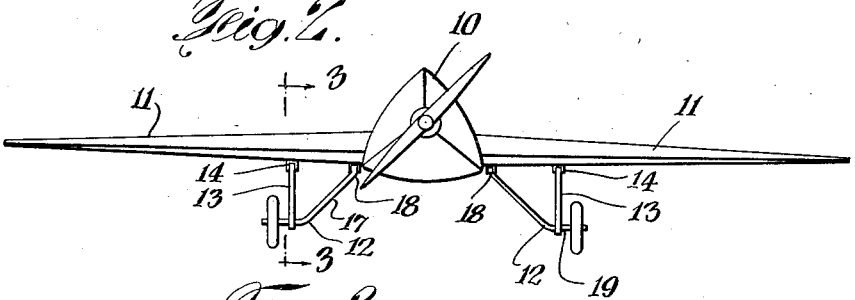
Figure 2 represents a front elevation of the same.
Figure 3:
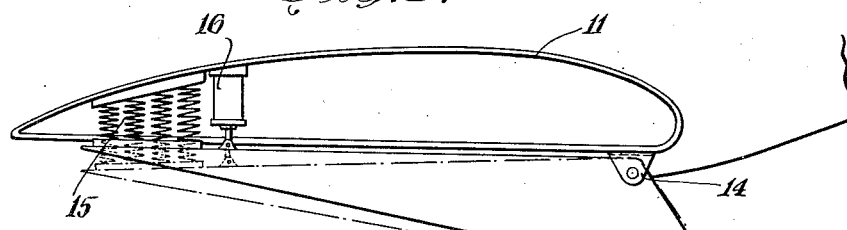
Figure 3 represents a cross section at 3—3 of Figure 2.

The operation of the landing gear is as follows:

When the plane contacts with a landing surface due to the leverage action between the line of the axles 19 and the pivots 14 and 18, Figures 2 and 3, the axles 19 tend to move in an upward direction. This movement draws the rear portion of the struts 13 away from the wing surface. The springs 15 are thus tensioned and react on the rear wing surface drawing it down. The rear end of the plane is thus caused to settle down towards the earth. It is, therefore, seen that an action is brought about in the plane which tends to counteract any tendency of the plane to overturn. When the springs 15 are brought into action, the dash pot 16 controls the force with which the strut goes back into position against the wing surface and causes a smooth adjustment to take place. In this way any slapping action of the strut and wing is eliminated.

The operation of the modification shown in Figures 5, 6, 7, 8 and 9 is similar to that already described above, but by this method of construction I have been able to eliminate the usual diagonal strut members in the conventional type of landing gear. The stream linings 21 and 22 are connected to the frame work of the landing gear. I have been able to achieve an extremely light and strong construction. This is due to the fact that inasmuch as the members 23 are the only elements which must withstand compressive stresses they are the only members which must be of great strength. The pivots 24 are placed such a distance apart and are so constructed that they will withstand any side strains which may be brought to bear upon the wheel. The structural elements 26, 27 and 28 are tension members so that they necessitate only a very light construction. When the wheels strike some rough object they tend to pivot upward about the points 24 causing a movement of the portion of the structure 29 away from the wing surface. This causes a tensioning of the spring 15 and results in a downward pull upon the rear portion of the wing 26. This movement by pulling the tail of the plane down tends to keep the plane from nosing over. The reseating movement of the undercarriage is controlled by the dash pot 16 as described above.

The springs 15 may be of such a strength that the struts 13 are held firmly in position against the wing under ordinary operating conditions. In this case the usual shock absorbers may be used for the wheels. It is possible, however, to adjust the springs and retarding connections in such a manner as to have my device act in place of the conventional shock absorbers used on the under carriages and also act in the manner described above.

It can be easily seen that my landing gear gives an exceedingly simple and clean cut design. The direct upward stresses are taken by the struts 13 and are not transferred to the wing or fuselage at one point, but rather may be transferred through the entire upper surface of the strut. The side stresses are taken by the struts 17.

I have described only specific forms of my landing gear. To those skilled in the art it is obvious that there are many possible modifications. For example, my landing gear may be attached either to the wings or fuselage of an aircraft depending on the design. The resilient connection between the struts and the airplane may be on the same side of the pivot connection as the wheels and the upper surface of the struts adapted to recess in the airplane surface. It is obvious also that various elements may be substituted for the spring and dash-pot arrangement which I have used between the strut and the wing. For these reasons I do not wish to be limited by this description and drawing, but only by the prior art and the appended claims.

I claim:

1. An airplane landing gear comprising a generally triangular frame pivotally connected to said airplane, said frame having a compression member extending from the pivot point forwardly and downwardly, a ground contacting element connected to the forward portion of said frame, said frame having a tension member extending from the forward end of said compression member rearwardly and upwardly to the airplane, a bracing member between the tension member and the pivot point, and a resilient connecting means between the after part of the frame and a stable part of the airplane.

2. An airplane landing gear comprising a generally triangular frame pivotally connected to a stable part of an airplane at a forward part of said frame and resiliently connected at a rearward part of said frame, said frame having a compression member adapted to carry the landing stress and tension member adapted to carry the stress of pivotal movement.

3. An airplane having self-contained streamlined landing gear, said landing gear being pivotally fastened at a forward part and resiliently fastened at a rearward part to the wing.

4. A landing gear for aircraft comprising an individual, self-contained landing gear frame, pivotally connected at a forward part to an aircraft wing and resiliently connected at a rearward part to said aircraft, a ground contacting means connected to said frame and an outer streamline shell enclosing said frame.

In testimony whereof, I have signed my name to this specification this 29th day of March, 1929.

EDMUND B. CARNS.